US012433372B2

(12) United States Patent
Talley (10) Patent No.: US 12,433,372 B2
(45) Date of Patent: Oct. 7, 2025

(54) APPARATUS, SYSTEM, AND METHOD FOR LOCKING LACES (71) Applicant: U-Lace, LLC, Rochester, NY (US)

(72) Inventor: Timothy J. Talley, Rochester, NY (US)

(73) Assignee: U-Lace, LLC, Rochester, NY (US)

( * ) Notice: Subject to any disclaimer, the term of this patent is extended or adjusted under 35 U.S.C. 154(b) by 255 days.

(21) Appl. No.: 18/213,472

(22) Filed: Jun. 23, 2023

(65) Prior Publication Data
US 2024/0423326 A1 Dec. 26, 2024

(51) Int. Cl.
A43C 7/00 (2006.01)
A43C 1/02 (2006.01)

(52) U.S. Cl.
CPC ............... A43C 7/005 (2013.01); A43C 1/02 (2013.01)

(58) Field of Classification Search
CPC .................. A43C 7/005; A43C 1/02
See application file for complete search history.

(56) References Cited

U.S. PATENT DOCUMENTS

| 932,125 | A | * | 8/1909 | Hirschfield | ............. | A43C 1/02 24/17 A |
| 2,164,123 | A | * | 6/1939 | Rio | ............. | A43C 7/04 24/136 R |
| 4,807,333 | A | * | 2/1989 | Boden | ............. | F16G 11/106 24/136 R |
| 6,192,559 | B1 | * | 2/2001 | Munsell, Jr. | ............. | A43C 7/00 24/712.9 |
| 6,871,423 | B2 | * | 3/2005 | King, Jr. | ............. | A43C 7/04 24/712.9 |
| 8,739,373 | B1 | * | 6/2014 | Berman | ............. | A43C 7/04 24/712.6 |
| 9,185,948 | B2 | * | 11/2015 | Ben-Arie | ............. | A43C 7/04 |
| 2007/0011912 | A1 | * | 1/2007 | Clark | ............. | A43B 5/08 36/50.1 |
| 2010/0293767 | A1 | * | 11/2010 | Talley | ............. | A43C 1/02 24/713.6 |
| 2013/0160256 | A1 | | 6/2013 | Waldman et al. | | |
| 2014/0208551 | A1 | * | 7/2014 | Ben-Arie | ............. | A43C 7/04 24/712.9 |
| 2015/0223569 | A1 | | 8/2015 | Cox | | |
| 2015/0230558 | A1 | * | 8/2015 | Flores | ............. | A43C 1/00 24/72.7 |
| 2018/0153262 | A1 | * | 6/2018 | Shimizu | ............. | F16G 11/101 |
| 2018/0255878 | A1 | * | 9/2018 | Harris | ............. | A43C 7/00 |
| 2019/0078646 | A1 | * | 3/2019 | Shimizu | ............. | F16G 11/106 |

* cited by examiner

Primary Examiner — David M Upchurch
(74) Attorney, Agent, or Firm — Ladas & Parry LLP (57) ABSTRACT An apparatus, system, and method for locking laces are provided. The system includes a lace lock and a shoelace. The shoelace has toggles at respective first and second ends of the shoelace, which toggles are moveable from a first position to a second position. The lace lock has a unitary body that engages the toggles of the shoelaces in the second position to secure both ends of the shoelace in the unitary body in a fixed position between the opposing toggles without any portion of the shoelace hanging out of the unitary body.

12 Claims, 9 Drawing Sheets

APPARATUS, SYSTEM, AND METHOD FOR LOCKING LACES

BACKGROUND OF THE INVENTION a. Field of the Invention

The present application relates to an apparatus, system, and method for locking laces.

b. Related Art

It is common practice to pull on the ends of a shoelace in order to cinch a shoe or other article of footwear about the foot, and then tie the ends together to prevent the lace from loosening.

However, the traditional approach of tensioning and then tying shoelaces presents a number of drawbacks. Although simple enough for most people, the task is still tedious and frequently annoying, especially when the knots accidentally undo and the laces go loose, typically at a most inopportune time. For many people, however, the task can present a much greater challenge. For example, many people experience impaired dexterity in their hands and fingers, in some cases due to advanced age but in others as a result of disease, trauma, neurological/muscular skeletal conditions (e.g., arthritis, dyskinesia, Parkinson's disease) or side effects of drugs or substances. For such individuals, the act of tying an untying a knot in a shoelace may prove frustrating or even impossible.

Furthermore, loose shoelaces commonly create a trip hazard that can lead to a fall, which can have serious consequences for anyone, but even more so for those engaged in running and other athletic activities. Furthermore, an untied shoelace may present grave consequences if the wearer is engaged in a high risk activity, such as work in a hazardous environment (e.g., around rotating or moving equipment), climbing/working at heights, or engaged in law enforcement/firefighting activities/military activities.

There have been efforts to address these problems by providing locks for shoelaces. The following patent publications, all of which are hereby incorporated herein by reference, provide a few examples. The solutions posed in the prior art publications do not adequately address the problem of shoelaces that dangle after being locked.

U.S. Patent Application Publication No. 2013/0160256 A1 to Waldman, et al., relates to a locking mechanism and system for fastening or locking laces, such as shoe laces to prevent the laces from coming untied and to avoid the user tripping over the lace ends.

U.S. Patent Application Publication No. 2015/0223569 A1 to Cox relates to systems and apparatus for locking the laces.

U.S. Patent Application Publication No. 2018/0255878 A1 to Harris relates to a lock piece having first and second channels that allow the ends of an elastomeric shoelace to be drawn therethrough as a user applies tension, but that grip and hold the lace ends against loosening when released by the user.

SUMMARY OF THE INVENTION

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

In one aspect, there is provided a system for lacing shoes having a plurality of sets of opposing eyelets. The shoelace is designed to be threaded through the sets of opposing eyelets of the shoes in a crisscross configuration with the shoelace first passing through a bottommost pair of opposing eyelets and then passing in crisscross fashion consecutively through each of the other sets of opposing eyelets, including a topmost set of opposing eyelets. The system comprises: (a) an elastic shoelace that is stretchable between a non-stretched configuration and a stretched configuration, the elastic shoelace comprising (i) an elongate body having a first end and a second end, and (ii) first and second toggles disposed on the respective first and second ends of the elongate body, each of the first and second toggles comprising a first end portion secured to a respective one of the first and second ends of the elongate body and a second end portion movable from a first position that is aligned with the elongate body to a second position that is spaced from the elongate body; and (b) a unitary body comprising means for engaging the first and second toggles with the first and second toggles in the second position and with the shoelace in the stretched position to secure the first and second ends of the shoelace in the unitary body in a fixed position between the topmost set of opposing toggles without any portion of the shoelace hanging out of the unitary body.

In one embodiment, the unitary body comprises first and second sides, and first and second channels extending from the first side to the second side of the unitary body with each of the first and second channels comprising a lip along at least a portion thereof. Each of the first and second channels is sized and dimensioned to permit the first and second ends of the elongate body to pass through either of the respective channels from the first side to the second side of the unitary body with the first and second toggles in the first position. The respective lips of the first and second channels are configured and arranged to engage respective of the first and second toggles with the first and second toggles in the second position when the first and second ends of the elongate body have passed through the respective first and second channels and respective forces pull on the respective first and second ends of the elongate body toward removal of the respective first and second ends from the respective first and second channels, and wherein, with the shoelace threaded through the eyelets in the shoe, with the first and second ends of the elongate body passed through the respective first and second channels of the unitary body and with the respective lips of the first and second channels engaging the respective first and second ends of the elongate body with the first and second toggles in the second position, the respective lips secure the respective first and second ends of the elongate body in place and prevent them from being pulled out of the respective first and second channels of the unitary body when the respective forces pull on the respective first and second ends toward their removal.

Preferably, the elastic shoelace is sized and dimensioned such that, with the elastic shoelace threaded through the plurality of sets of opposing eyelets of the shoe, with the respective first and second ends of the elongate body passing through the respective first and second channels of the unitary body and with the respective second portions of the first and second ends in the second position, the elastic shoelace is in the stretched configuration and exerts a force on each of the respective first and second ends that causes the first and second ends to engage with the respective lips of the first and second channels to secure the respective first and second ends in place in the unitary body.

In another embodiment, the unitary body comprises opposing top and bottom sides that are disposed substantially transverse to the first and second sides. Each of the top and bottom sides comprises respective first and second grooves along at least a portion of a length thereof. The respective lips of the first and second channels are disposed in respective bottoms of the first and second grooves in the top and bottom sides of the unitary body.

In still another embodiment, the first groove in the top side of the unitary body extends along an entirety of the top side of the unitary body and forms an opening at a top portion of each of the first and second sides. The second groove in the bottom side of the unitary body extends along an entirety of the bottom side of the unitary body and forms an opening at a bottom portion of each of the respective first and second sides. The first channel extends diagonally from a middle portion of the first side to the opening formed by the first groove at the top portion of the second side and the second channel extends diagonally from a middle portion of the second side to the opening formed by the second groove at the bottom portion of the first side. The lip of the first channel extends from the first side of the unitary body along a portion of the bottom of the first groove in the top side of the unitary body and the lip of the second channel extends from the second side of the unitary body along a portion of the bottom of the second groove in the bottom side of the unitary body.

In a preferred embodiment, a length and elasticity of the shoelace is such that, when threaded through the sets of opposing eyelets of the shoe with the shoelace first passing through a bottom pair of opposing eyelets and then passing in crisscross fashion consecutively through each of the other sets of opposing eyelets, including a top set of opposing eyelets, the respective first and second ends of the elongate body are in the stretched configuration when they pass through the first and second channels in the unitary body.

In another preferred embodiment, the length of the elongate body satisfies the following equation:

$$\text{Length} = (e \times 2 \times 0.125) + bes + 2*\left(\sqrt{bes^2 + edist^2}\right) + \\ 2*\sqrt{(bes + \text{Span}\Delta)^2 + edist^2} + 2*\sqrt{(bes + 2*\text{Span}\Delta)^2 + edist^2} + \\ 2*\sqrt{(bes + 3*\text{Span}\Delta)^2 + edist^2} + 2*\sqrt{(bes + 4*\text{Span}\Delta)^2 + edist^2},$$

wherein
e=a number of sets of eyelets of the shoe,
tes=a top eyelet span of the shoe,
bes=a bottom eyelet span of the shoe,
edist=an eyelet spacing distance of the shoe,
Span Δ=tes−bes, and
pe Δ=per eyelet span Δ=Span Δ÷(e−1).

In an exemplary embodiment, the system further comprises packaging comprising the elastic shoelace, and the unitary body.

In another aspect, there is provided a lace lock for an elastic lace comprising an elongate body. The elongate body is stretchable between a non-stretched configuration and a stretched configuration. The elastic lace comprises (i) an elongate body having a first end and a second end, and (ii) first and second toggles disposed on the respective first and second ends of the elongate body, each of the first and second toggles comprising a first end portion secured to a respective one of the first and second ends of the elongate body and a second end portion movable from a first position that is aligned with the elongate body to a second position that is spaced from the elongate body, the lace lock comprising a unitary body having first and second sides, the unitary body comprising first and second channels extending from the first side to the second side of the unitary body with each of the first and second channels comprising a lip along at least a portion thereof. Each of the first and second channels is sized and dimensioned to permit the first and second ends of the elongate body to pass through either of the respective channels from the first side to the second side of the unitary body with the first and second toggles in the first position. The respective lips of the first and second channels are configured and arranged to engage respective of the first and second toggles with the first and second toggles in the second position when the first and second ends of the elongate body have passed through the respective first and second channels and respective forces pull on the respective first and second ends of the elongate body toward removal of the respective first and second ends from the respective first and second channels. With the shoelace threaded through the eyelets in a shoe, with the first and second ends of the elongate body passed through the respective first and second channels of the unitary body and with the respective lips of the first and second channels engaging the respective first and second ends of the elongate body with the respective first and second toggles in the second position, the respective lips secure the respective first and second ends of the elongate body in place and prevent them from being pulled out of the respective first and second channels of the unitary body when the respective forces pull on the respective first and second ends toward their removal.

In one embodiment, the unitary body comprises opposing top and bottom sides that are disposed substantially transverse to the first and second sides. Each of the top and bottom sides comprises respective first and second grooves along at least a portion of a length thereof. The respective lips of the first and second channels are disposed in respective bottoms of the first and second grooves in the top and bottom sides of the unitary body.

In another embodiment, the first groove in the top side of the unitary body extends along an entirety of the top side of the unitary body and forms an opening at a top portion of each of the first and second sides. The second groove in the bottom side of the unitary body extends along an entirety of the bottom side of the unitary body and forms an opening at a bottom portion of each of the respective first and second sides. The first channel extends diagonally from a middle portion of the first side to the opening formed by the first groove at the top portion of the second side and the second channel extends diagonally from a middle portion of the second side to the opening formed by the second groove at the bottom portion of the first side. The lip of the first channel extends from the first side of the unitary body along a portion of the bottom of the first groove in the top side of the unitary body and the lip of the second channel extends from the second side of the unitary body along a portion of the bottom of the second groove in the bottom side of the unitary body.

In yet another aspect, there is provided a method for making a shoelace of a predetermined size for matching to a shoe comprising a plurality of sets of opposing eyelets. The method comprising the steps of: (a) providing a spool of lace to be cut into shoelaces of the predetermined size, wherein the lace has an elasticity that allows it to stretch from an unstretched configuration to a stretched configuration; (b) determining a length of each of the shoelaces according to the following equation:

$$\text{Length} = (e \times 2 \times 0.125) + bes + 2 * \left(\sqrt{bes^2 + edist^2}\right) + \\ 2 * \sqrt{(bes + \text{Span}\Delta)^2 + edist^2} + 2 * \sqrt{(bes + 2 * \text{Span}\Delta)^2 + edist^2} + \\ 2 * \sqrt{(bes + 3 * \text{Span}\Delta)^2 + edist^2} + 2 * \sqrt{(bes + 4 * \text{Span}\Delta)^2 + edist^2},$$

wherein
e=a number of sets of eyelets of the shoe,
tes=a top eyelet span of the shoe,
bes=a bottom eyelet span of the shoe,
edist=an eyelet spacing distance of the shoe,
Span Δ=tes−bes, and
pe Δ=per eyelet span Δ=Span Δ÷(e−1);
(c) cutting the lace from the spool of lace into a plurality of the shoelaces of the desired length, with each of the plurality of shoelaces comprising a first end and a second end; (d) attaching a first toggle to the first end of each of the plurality of shoelaces with a first portion of the first toggle attached to the first end of each of the plurality of shoelaces and a second portion of the first toggle free to move between a first position aligned with the shoelace and a second position spaced from the shoelace; and (e) attaching a second toggle to the second end of each of the plurality of shoelaces with a first portion of the second toggle attached to second end of each of the plurality of shoelaces and a second portion of the second toggle free to move between a first position aligned with the shoelace and a second position spaced from the shoelace.

In one embodiment, the method further comprises the step of packaging the lace into a package that also comprises a label, instruction sheet, or diagram that indicates the shoe with which the shoelace of the predetermined size is matched.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure.

DETAILED DESCRIPTION OF THE PREFERRED EMBODIMENTS

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
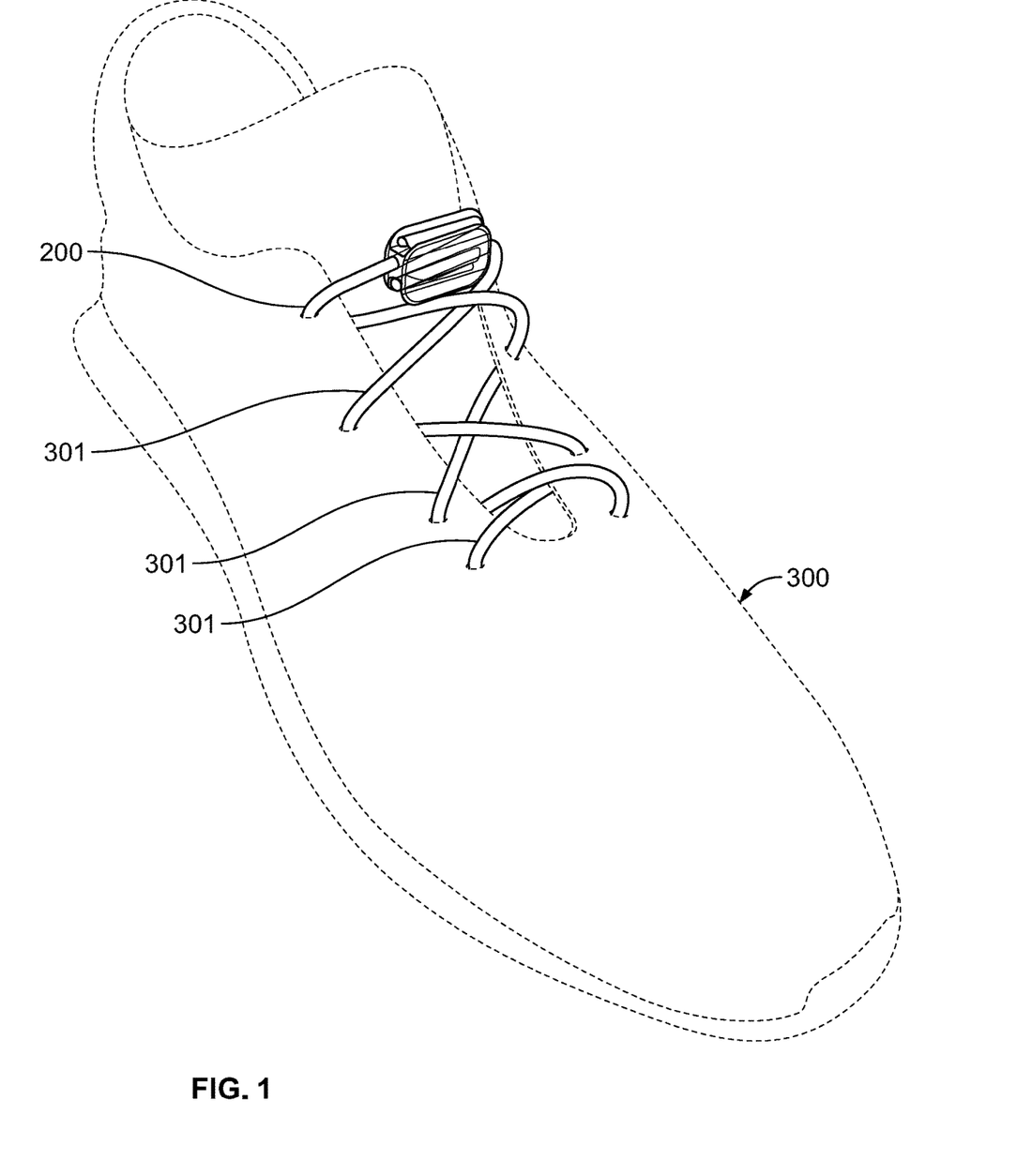
FIG. 1 is a front perspective view of a shoe, a lace lock, and a shoelace according to one embodiment of the present disclosure.
Figure 2A:
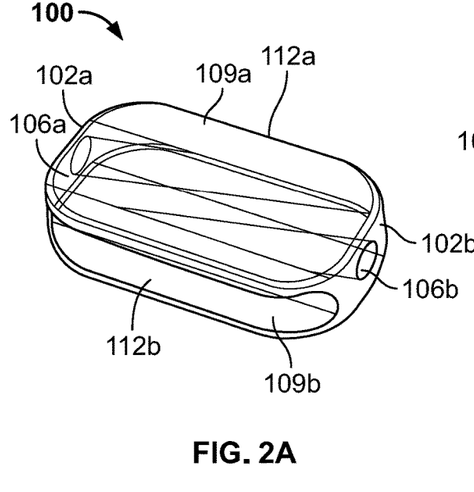
FIG. 2A is a front perspective view of a lace lock according to one embodiment of the present disclosure.
Figure 2B:
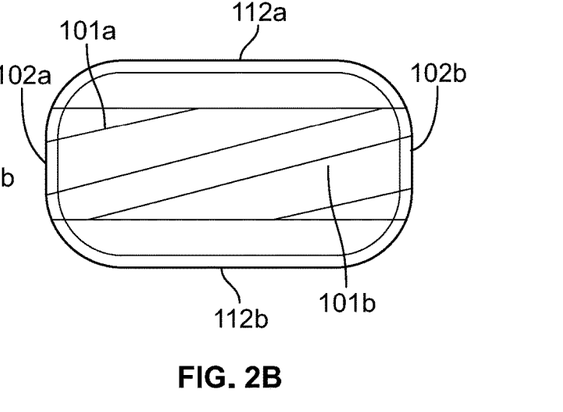
FIG. 2B is a top view of a lace lock according to one embodiment of the present disclosure.
Figure 2C:
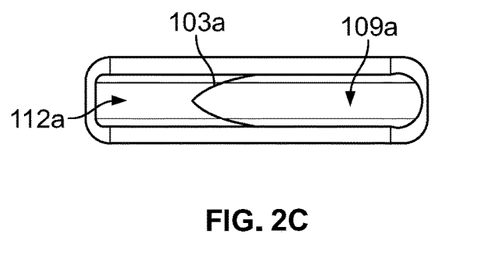
FIG. 2C is a side view of a lace lock according to one embodiment of the present disclosure.
Figure 2D:
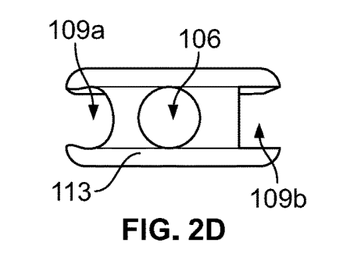
FIG. 2D is an end view of a lace lock according to one embodiment of the present disclosure.
Figure 2E:
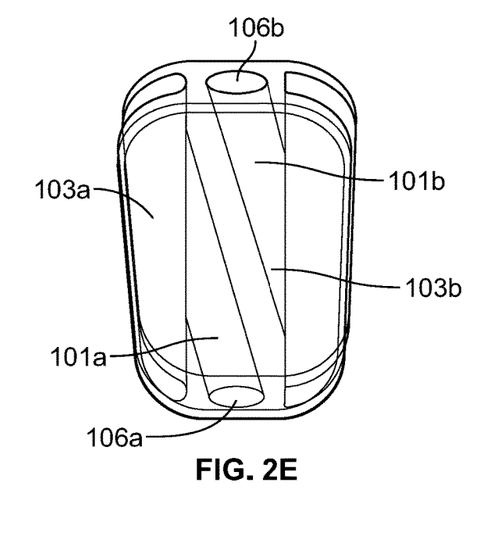
FIG. 2E is a bottom perspective view according to one embodiment of the present disclosure.

Referring to FIG. 1, there is seen a shoe 300 with a lace lock 100 and a shoelace 200 according to one embodiment of the present disclosure. The shoelace 200 is inserted into a plurality of eyelets 301 on the shoe 300 in a conventional manner. Near an upper side of the shoe 300, i.e., a part closer to a user's ankle, toggles of the shoelace 200 are inserted in the lace lock 100. It is noted that FIG. 1 shows only an exemplary configuration of one embodiment and that there are numerous ways of utilizing the lace lock 100 and the shoelace 200. It should be noted that the lace lock 100 may be used locking laces for various purposes other than securing footwear.

Referring to FIGS. 2A-2E, there is a lace lock 100 according to one embodiment of the present disclosure. The lace lock 100 comprises a unitary body 113 having first and second sides 102a, b. The unitary body 113 comprises first and second channels 101a, b extending from the first side 102a to the second side 102b of the unitary body 113 with each of the first and second channels 101a, b comprising a lip 103a or 103b along at least a portion thereof; wherein each of the first and second channels 101a, b is sized and dimensioned to permit the first and second ends of the elongate body to pass through either of the respective channels 101a, b from the first side 102a to the second side 102b of the unitary body 113 with the first and second toggles of the shoelace 200 in a first position. The respective lips 103a, b of the first and second channels 101a, b are configured and arranged to engage respective of the first and second toggles with the first and second toggles in a second position when first and second ends of an elongate body of the shoelace 200 have passed through the respective first and second channels 101a, b and respective forces pull on the respective first and second ends of the elongate body toward removal of the respective first and second ends from the respective first and second channels 101a, b.

In a preferred embodiment, the unitary body 113 comprises opposing top and bottom sides 112a, b that are disposed substantially transverse to the first and second sides 102a, b. Each of the top and bottom sides 112a, b comprises respective first and second grooves 109a, b along at least a portion of a length thereof. The respective lips 103a, b of the first and second channels 101a, b are disposed in respective bottoms of the first and second grooves 109a, b in the top and bottom sides 112a, b of the unitary body 113.

Still referring to FIGS. 2A-2E, the first groove 109a in the top side 112a of the unitary body 113 extends along an entirety of the top side 112a of the unitary body 113 and forms an opening at a top portion of each of the first and second sides 102a, b. The second groove 109b in the bottom side 112b of the unitary body 113 extends along an entirety of the bottom side 112b of the unitary body 113 and forms an opening at a bottom portion of each of the respective first and second sides 102a, b. The first channel 101a extends diagonally from a middle portion 106a of the first side 102a to the opening formed by the first groove 109a at the top portion of the second side 102b and the second channel 101b extends diagonally from a middle portion 106b of the second side 102b to the opening formed by the second groove 109b at the bottom portion of the first side 102a. The lip 103a of the first channel 101a extends from the first side 102a of the unitary body 113 along a portion of the bottom of the first groove in the bottom 112b side of the unitary body 113 and the lip 103b of the second channel 101b extends from the second side 102b of the unitary body 113 along a portion of the bottom of the second groove in the top side 112a of the unitary body 113.

In one embodiment, a lace lock 100 comprises a unitary body 113 having first and second sides 102a, b. The unitary body 113 comprises first and second channels 101a, b extending from the first side 102a to the second side 102b of the unitary body 113 with each of the first and second channels 101a, b comprising a lip 103a or 103b along at least a portion thereof. Each of the first and second channels 101a, b is sized and dimensioned to permit the first and second ends of the elongate body 205 to pass through either of the respective channels 101a, b from the first side 102a to the second side 102b of the unitary body 113 with the first and second toggles 201a, b in the first position. The respective lips 103a, b of the first and second channels 101a, b are configured and arranged to engage respective of the first and second toggles 201a, b with the first and second toggles 201a, b in the second position when the first and second ends of the elongate body 205 have passed through the respective first and second channels 101a, b and respective forces pull on the respective first and second ends of the elongate body 205 toward removal of the respective first and second ends from the respective first and second channels 101a, b. With the shoelace 200 threaded through the eyelets 301 in a shoe 300, with the first and second ends of the elongate body 205 passed through the respective first and second channels 101a, b of the unitary body 113 and with the respective lips 103a, b of the first and second channels 101a, b engaging the respective first and second ends of the elongate body 205 with the respective first and second toggles 201a, b in the second position, the respective lips 103a, b secure the respective first and second ends of the elongate body 205 in place and prevent them from being pulled out of the respective first and second channels 101a, b of the unitary body 113 when the respective forces pull on the respective first and second ends toward their removal.

Preferably, the unitary body 113 further comprises opposing top and bottom sides 112a, b that are disposed substantially transverse to the first and second sides 102a, b. Each of the top and bottom sides 112a, b comprises respective first and second grooves 109a, b along at least a portion of a length thereof. The respective lips 103a, b of the first and second channels 101a, b are disposed in respective bottoms of the first and second grooves 109a, b in the top and bottom sides 112a, b of the unitary body 113. The first groove 109a in the top side 112a of the unitary body 113 extends along an entirety of the top side of the unitary body 113 and forms an opening at a top portion of each of the first and second sides. The second groove in the bottom side 112b of the unitary body 113 extends along an entirety of the bottom side 112b of the unitary body 113 and forms an opening at a bottom portion of each of the respective first and second sides 102a, b. The first channel 101a extends diagonally from a middle portion 106a of the first side 102a to the opening formed by the first groove 109a at the top portion of the second side 102b and the second channel 101b extends diagonally from a middle portion 106b of the second side 102b to the opening formed by the second groove 109b at the bottom portion of the first side 102a. The lip 103a of the first channel 101a extends from the first side 102a of the unitary body 113 along a portion of the bottom of the first groove 109a in the top side 112a of the unitary body 113 and the lip 103b of the second channel 101b extends from the second side 102b of the unitary body 113 along a portion of the bottom of the second groove 109b in the bottom side 112b of the unitary body 113.

Figure 3:
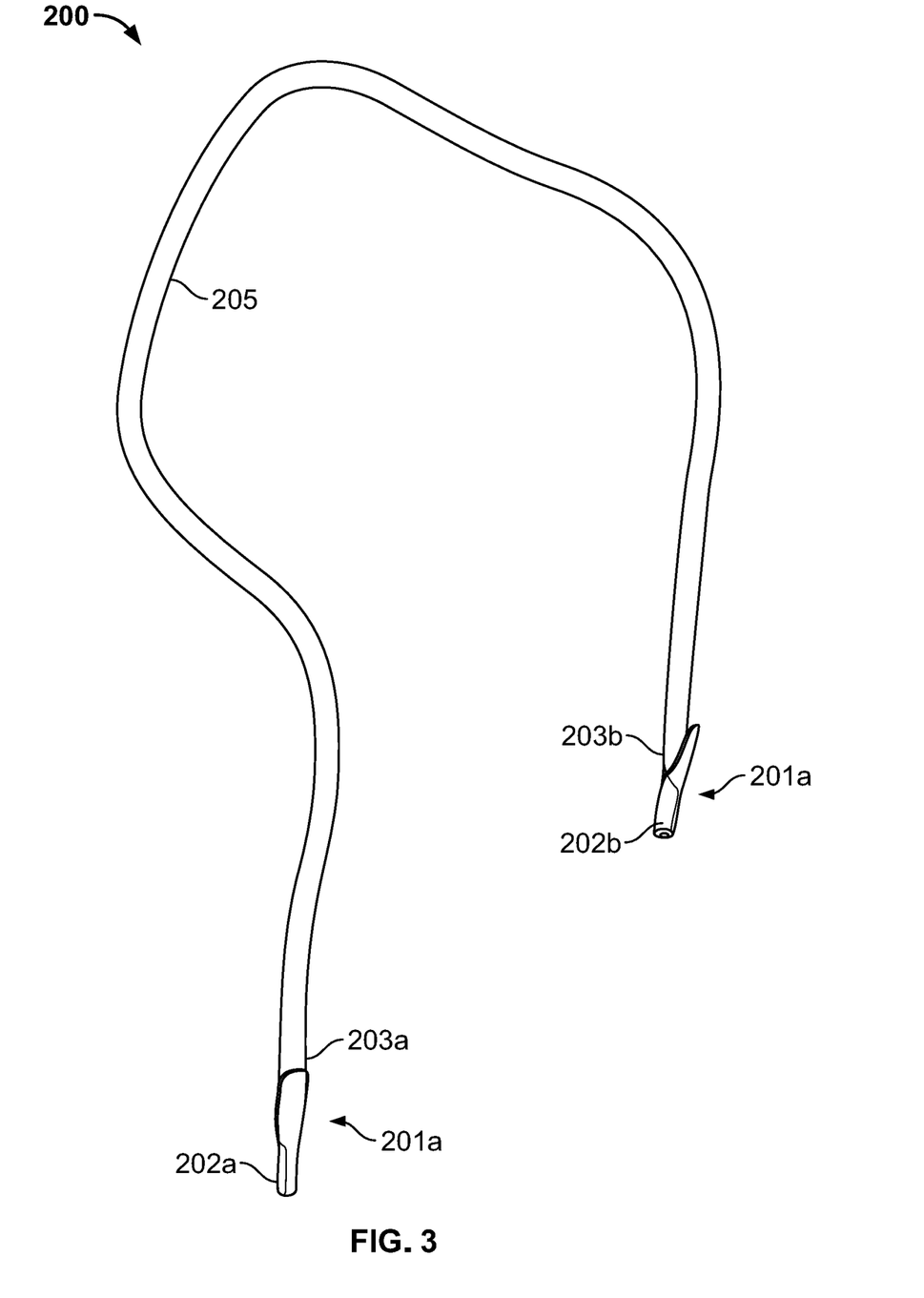
FIG. 3 shows an exemplary shoelace according to one embodiment of the present disclosure.

Referring to FIG. 3, there is seen a shoelace 200 according to one embodiment of the present disclosure. The shoelace 200 may be a round elastic elongate body 205 but is not limited to this. The shoelace 200 may be made of any material available in the market. The shoelace 200 may be stretchable between a non-stretched configuration and a stretched configuration. The shoelace 200 comprises an elongate body 205, a first toggle 201a, and a second toggle 201b. The elongate body 205 has a first end and a second end. Each of the first toggle 201a and the second toggle 201 has a first end portion 202a and a second end portion 203a. The first end portion 202a is secured to a respective one of the first and second ends of the elongate body. The second end portion 203a of the first toggle 201a is movable from a first position that is aligned with the elongate body 205 to a second position that is spaced from the elongate body. The second end portion 203a of the first toggle 201a is attached to a proximal end of the first toggle 201a, covering some portion of the elongate body 205. The first end portion 201a and the second end portion 203a of the first toggle 201a may be separate or a single piece. The same applies to the second toggle 201b and its first and second portions. The shoelace may have a defined length.

Referring to FIGS. 4A-4D, a first end of an exemplary shoelace 200 is shown in different angles. A first toggle 201a surrounds the first end of the shoelace 200. A second end portion 203a is attached to a proximal end of the first toggle 201a. The first toggle 201a may be made of inflexible, flexible, or semi-flexible material including plastic, metal, and/or alloy. The first toggle 201a may be for example transparent, translucent, and/or opaque, or has a drawing or a logo drawn on it. A shape and size of the first toggle 201a may be the same as or similar to commercially available toggles.

Still referring to FIGS. 4A-4D, the first toggle 201a comprises a first end portion 202a and a second end portion 203a. The second end portion 203a may be hemi-cylindrical and resemble a finger nail to a certain degree. A length of the second end portion 203a may be about the same as a length of the first end portion 202a. The second end portion 203a may cover some of the surface of the elongate body 205 around the second end portion 203a. The second end portion 203a comprises an arch 205a. A radius of the second end portion 203a may gradually increase as a distance from a distal end of the second end portion 203a to a proximal end of the second end portion 203a increases, with the distal end being closer to the extreme end of the first end of the shoelace 200 than the proximal end. The difference in the radius of the second end portion 203a allows the second end portion 203a to easily enter one of the channels 101a, b and to gradually generate friction as the second end portion 203a is inserted deeper into the channel 101a or 101b.

In another embodiment, the shoelace 200 is an elastic shoelace 200 that is stretchable between a non-stretched configuration and a stretched configuration. The elastic shoelace comprises (i) an elongate body 205 having a first end and a second end, and (ii) first and second toggles 201a, b disposed on the respective first and second ends of the elongate body 205. Each of the first and second toggles 201a, b comprise a first end portion 202a or 202b secured to a respective one of the first and second ends of the elongate body and a second end portion 203a or 203b movable from a first position that is aligned with the elongate body 205 to a second position that is spaced from the elongate body 205.

Figure 4A:
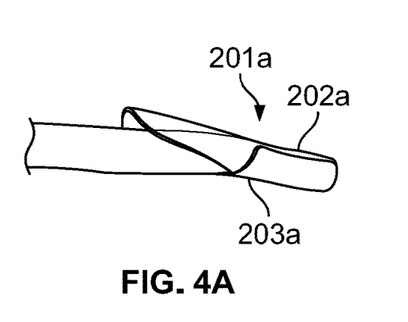
FIG. 4A is a perspective view of a first end of a shoelace according to one embodiment of the present disclosure.
Figure 4B:
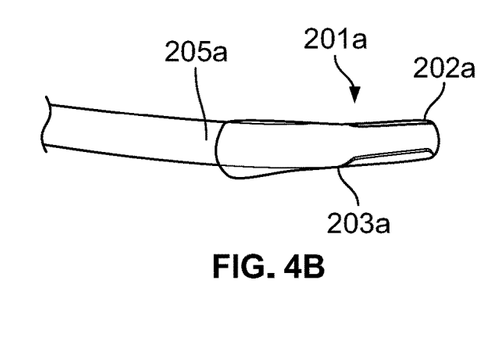
FIG. 4B is a top view of a first end of a shoelace according to one embodiment of the present disclosure.
Figure 4C:
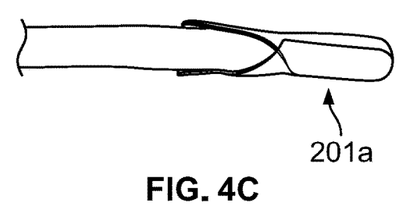
FIG. 4C is a bottom view of a first end of a shoelace according to one embodiment of the present disclosure.
Figure 4D:
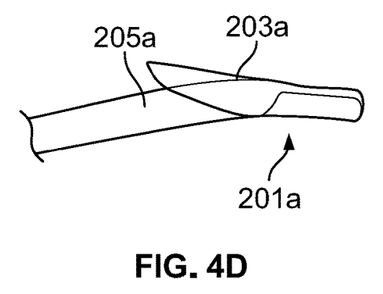
FIG. 4D is a side view of a first end of a shoelace according to one embodiment of the present disclosure.
Figure 4E:
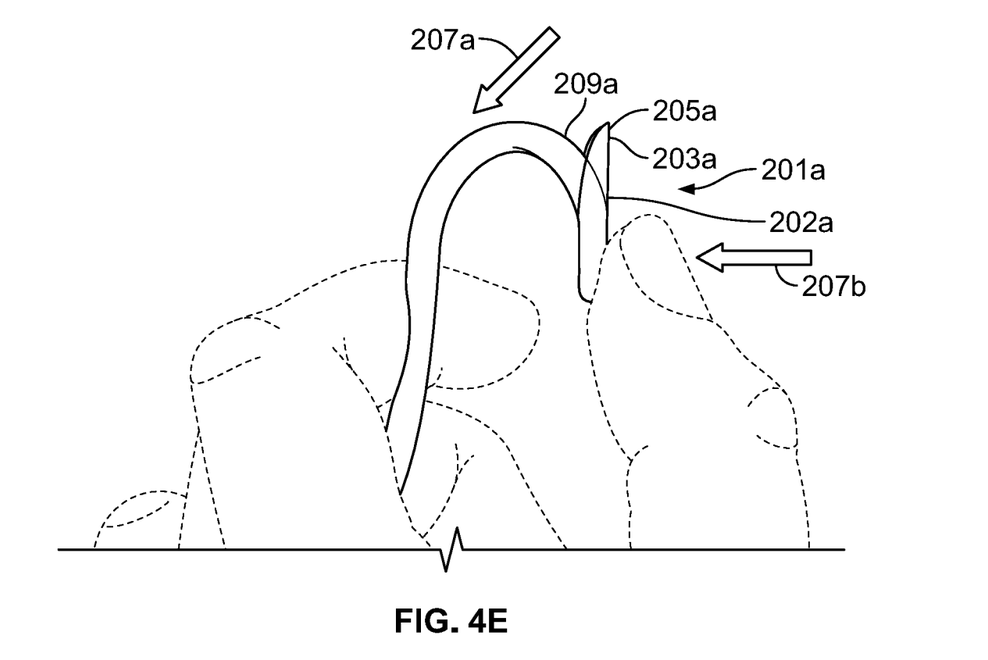
FIG. 4E is a side view of a first end of a shoelace when pressures are applied to the first end according to one embodiment of the present disclosure.

Referring to FIG. 4E, there is seen an exemplary first toggle 201a under pressures 207a, b. The pressures 207a may be applied to a proximal end of the second end portion 203a of the shoelace 200 and to an distal end of the first end portion 202a of the shoelace 200, respectively, in a way that the second end portion 203a moves away from the elongate body 205, exposing a first gap 209a between the second end portion 203a and the elongate body 205. The first arch 205a has a curved structure that slides an object pressed against a distal end of the first arch 205a into the gap 209a.

Figure 5A:
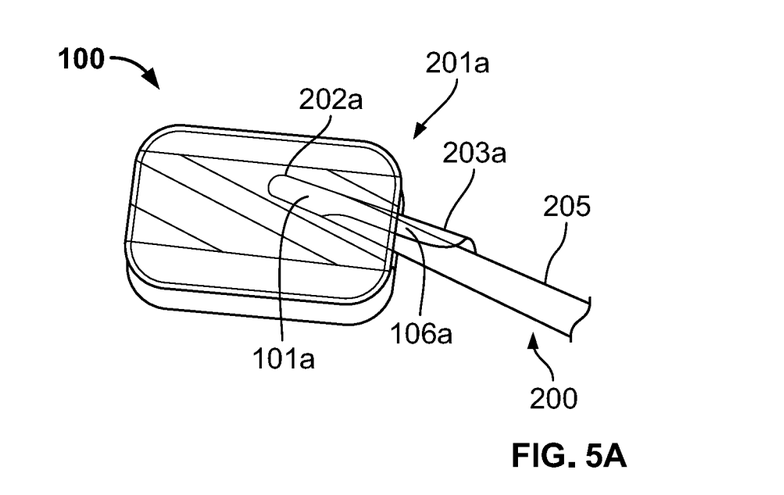
FIGS. 5A-C show exemplary steps of locking a shoelace with a lace lock according to one embodiment of the present disclosure.
Figure 5B:
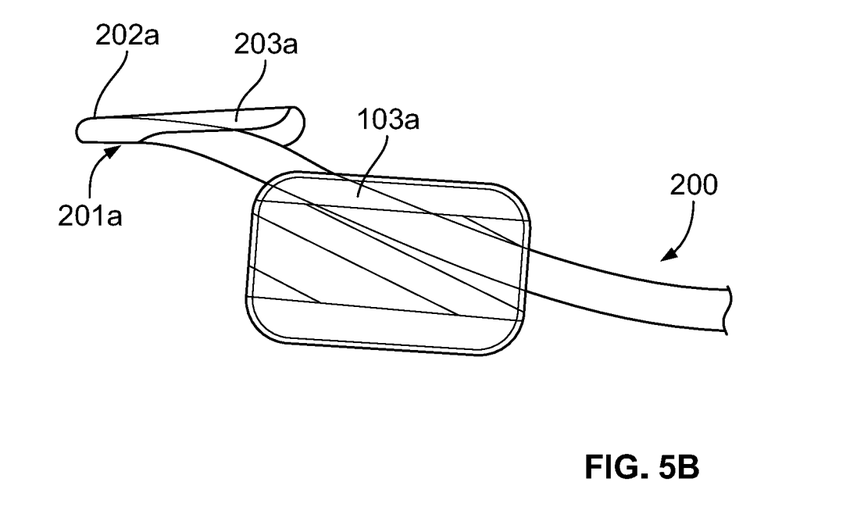
Figure 5C:
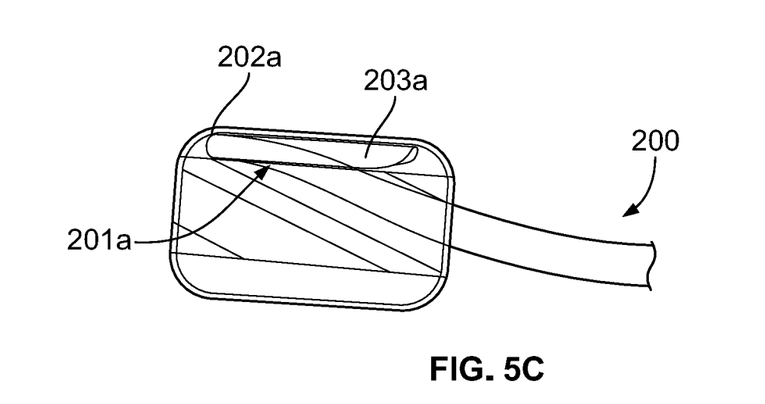

Referring to FIG. 5A-C, there is seen steps of an exemplary method for assembling a lack lock 100 with a shoelace 200 according to one embodiment. First, a first end portion 202a of a first toggle 201a is inserted forward into a first channel 101a through a middle portion 106a of a first side 102a for the lace lock 100. Here, a second end portion 203 is in a first position where the second end portion is aligned with an elongate body 205 of the shoelace 200. Next, the first toggle 201a is pushed into the first channel 101a until the second end portion 203a completely passes a first lips 103a. Then, the second end portion 203a is moved into a second position where the second end portion is spaced from the elongate body 205. To lock the first toggle 201a with the lace lock 100, the first toggle 201a is pulled backward toward its removal until the second end portion 203a is anchored at the lace lock 100.

Figure 6A:
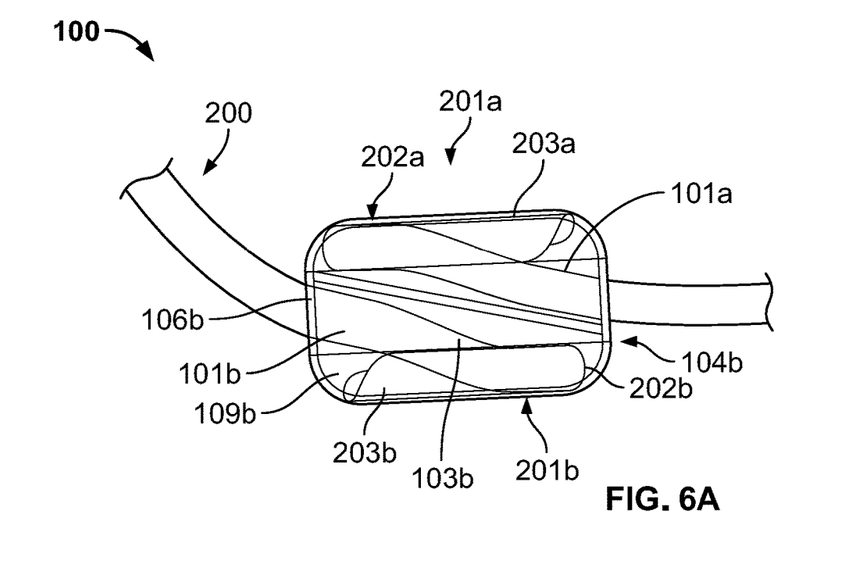
FIGS. 6A-B show both ends of a shoelace locked with a lace lock according to one embodiment of the present disclosure.
Figure 6B:
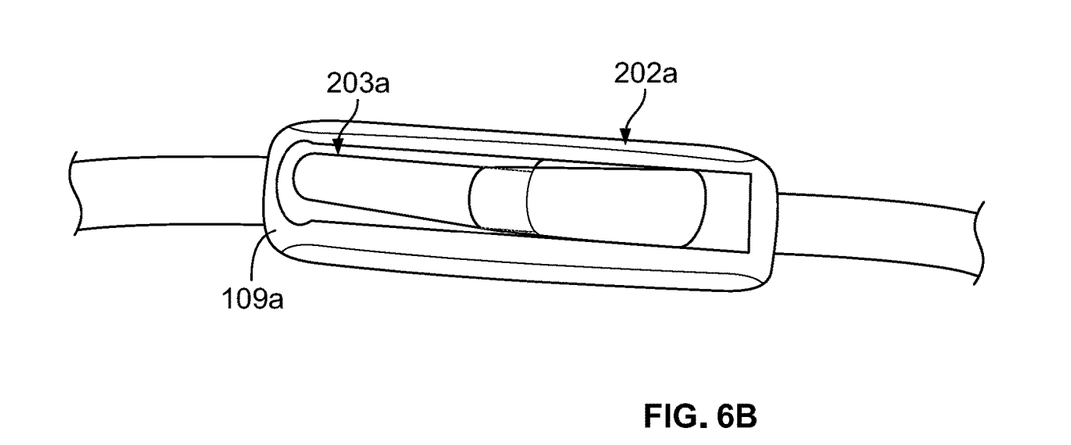

In FIGS. 6A-B, there are seen a shoelace 200 assembled with a lace lock 100 according to one embodiment of the present disclosure. With the shoelace 200 threaded through the eyelets 301 in the shoe 300, with the first and second ends of the elongate body passed through the respective first and second channels 101a, b of the unitary body 113 and with the respective lips 103a, b of the first and second channels 101a, b engaging the respective first and second ends of the elongate body with the first and second toggles 201a, b in the second position, the respective lips 103a, b secure the respective first and second ends of the elongate body in place and prevent them from being pulled out of the respective first and second channels 101a, b of the unitary body 113 when the respective forces pull on the respective first and second ends toward their removal. Preferably, the elastic shoelace 200 is sized and dimensioned such that, with the elastic shoelace 200 threaded through the plurality of sets of opposing eyelets of the shoe 300, with the respective first and second ends of the elongate body 205 passing through the respective first and second channels 101a, b of the unitary body 113 and with the respective second portions of the first and second ends in the second position, the elastic shoelace 200 is in the stretched configuration and exerts a force on each of the respective first and second ends that causes the first and second ends to engage with the respective lips 103a, b of the first and second channels 101a, b to secure the respective first and second ends in place in the unitary body 113.

Figure 7:
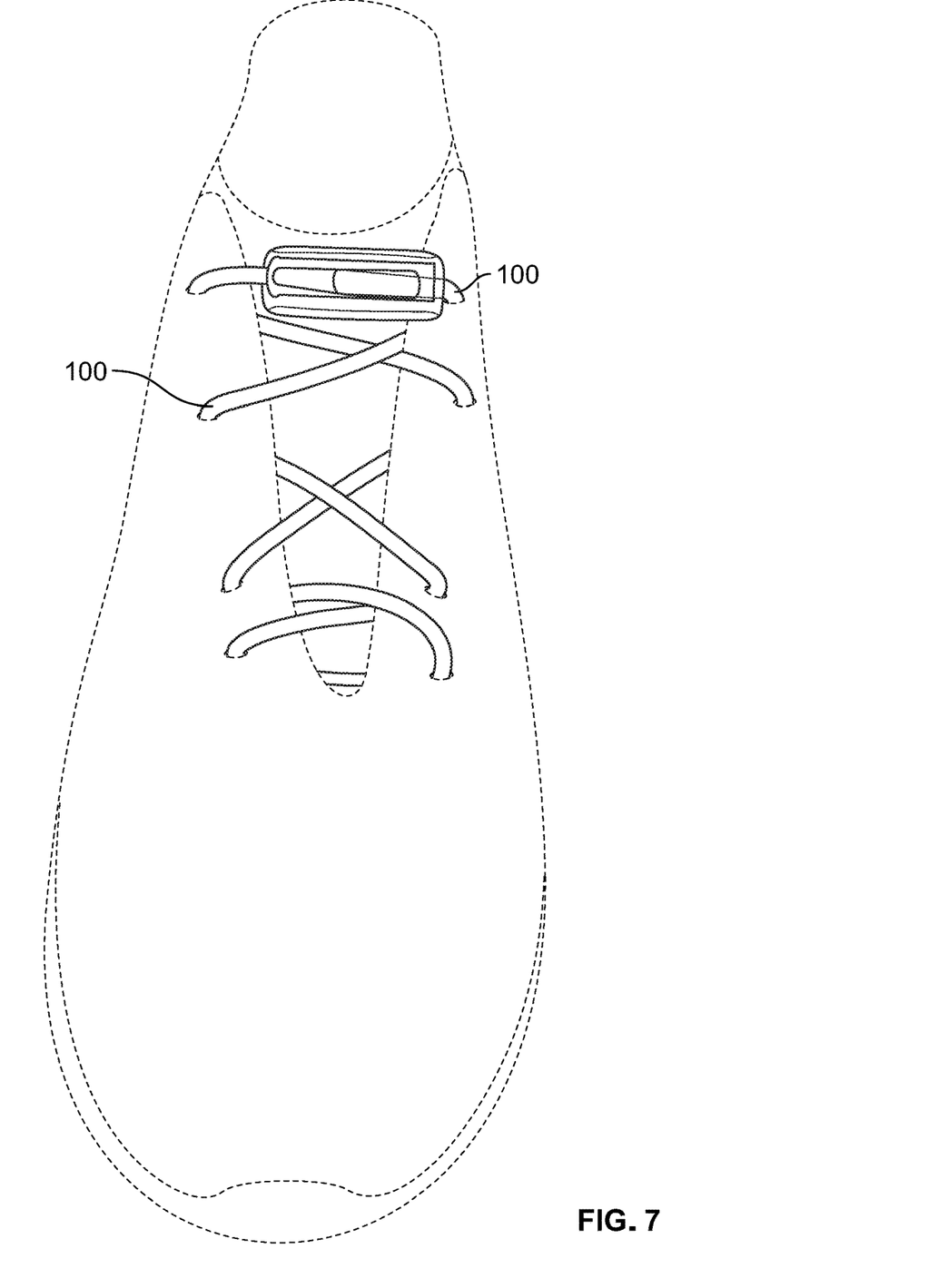
FIG. 7 is a front view of a show, a lace lock, and a shoelace according to one embodiment of the present disclosure.

FIG. 7 shows a shoelace 200 assembled with a lace lock 100 and a shoe 300 according to one embodiment. With this embodiment, a user does not need to tie a knot at the ends of the elongate body 205. An appropriate length of the shoelace 200 may be determined by an equation below:

$$\begin{aligned}\text{Length} = &(e \times 2 \times 0.125) + bes + 2*\left(\sqrt{bes^2 + edist^2}\right) + \\ &2*\sqrt{(bes + \text{Span}\Delta)^2 + edist^2} + 2*\sqrt{(bes + 2*\text{Span}\Delta)^2 + edist^2} + \\ &2*\sqrt{(bes + 3*\text{Span}\Delta)^2 + edist^2} + 2*\sqrt{(bes + 4*\text{Span}\Delta)^2 + edist^2},\end{aligned}$$

wherein
e=a number of sets of eyelets of a shoe,
tes=a top eyelet span of the shoe,
bes=a bottom eyelet span of the shoe,
edist=an eyelet spacing distance of the shoe,
Span Δ=tes−bes, and
pe Δ=per eyelet span Δ=Span Δ÷(e−1).

Preferably, a length and elasticity of the shoelace 200 is such that, when threaded through the sets of opposing eyelets 301 of the shoe 300 with the shoelace 200 first passing through a bottom pair of opposing eyelets 301 and then passing in crisscross fashion consecutively through each of the other sets of opposing eyelets 301, including a top set of opposing eyelets 301, the respective first and second ends of the elongate body 205 are in the stretched configuration when they pass through the first and second channels 101a, b in the unitary body 113.

According to one embodiment, there is provided a method for making a shoelace 200 of a predetermined size for a shoe comprising a plurality of sets of opposing eyelets 301, the method comprising the steps of: (a) providing a spool of lace to be cut into shoelaces 200 of the predetermined size, wherein the lace has an elasticity that allows it to stretch from an unstretched configuration to a stretched configuration; (b) determining a length of the each of the shoelaces according to the above equation; (c) cutting the lace from the spool of lace into a plurality of the shoelaces 200 of the desired length, with each of the plurality of shoelaces 200 comprising a first end and a second end; (d) attaching a first toggle 201a to the first end of each of the plurality of shoelaces 200 with a first portion 202a of the first toggle 201a attached to the first end of each of the plurality of shoelaces 200 and a second portion 203a of the first toggle 201a free to move between a first position aligned with the shoelace 200 and a second position spaced from the shoelace 200; and (e) attaching a second toggle 201b to the second end of each of the plurality of 200 shoelaces with a first portion 202b of the second toggle 201b attached to second end of each of the plurality of shoelaces 200 and a second portion 203b of the second toggle 201b free to move between a first position aligned with the shoelace 200 and a second position spaced from the shoelace 200. The method may further comprise the step of packaging the lace into a package that also comprises a label, instruction sheet or diagram that indicates the shoe with which the shoelace of the predetermined size is matched.

Figure 8:
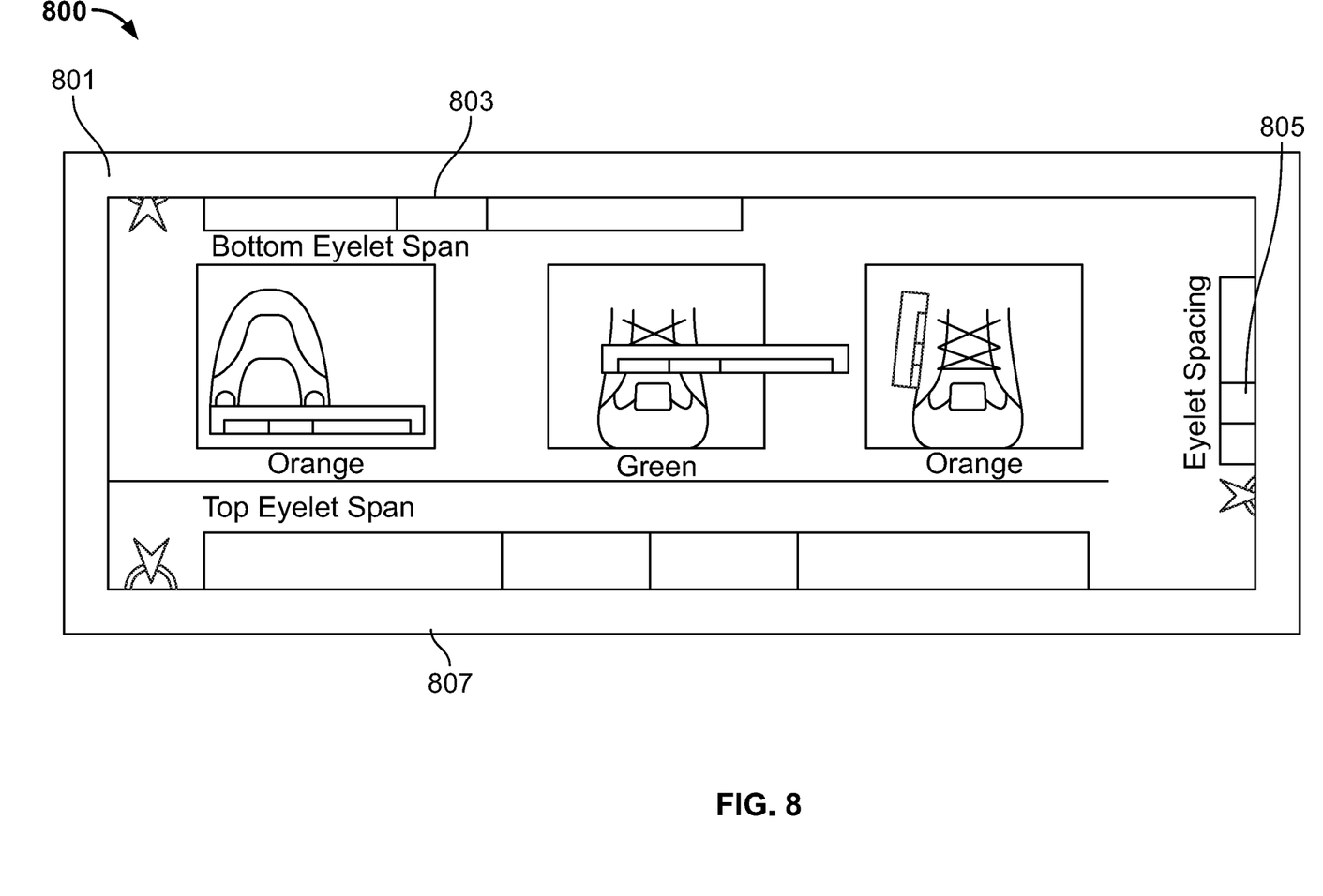
FIG. 8 is an exemplary measuring tool according to one embodiment of the present disclosure.

Referring to FIG. 8, there is seen an exemplary measuring device 800 according to one embodiment of the present disclosure. The measuring device 800 may be used to measure the variables used in the above equation. The measuring device 800 may comprise a body 801, means for measuring a bottom eyelet span 803, means for measuring an eyelet spacing 805, and means for measuring a top eyelet span 807. The body 801 may be a thin plate in the shape of for example a triangle, a rectangle, a rhombus, a squire, a trapezoid, etc. The body 801 may be made of for example paper, wood, plastic, metal, alloy, silicon, vinyl, etc. The means for measuring may be a thick line equally divided into a plurality of segments as shown in FIG. 8. These segments may be used to estimate eyelet spans/spacings. Each segment may be in a different color. The means for measuring an eyelet spacing 805 may be placed at one end of a flat surface of the body 801. The means for measuring a top eyelet span 807 may be placed at another end of a flat surface of the body 801. The means for measuring a top eyelet span 807 may be place another end of a flat surface of the body 801.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for lacing shoes having a plurality of sets of opposing eyelets, wherein the shoelace is designed to be threaded through the sets of opposing eyelets of the shoes in a crisscross configuration with the shoelace first passing through a bottommost pair of opposing eyelets and then passing in crisscross fashion consecutively through each of the other sets of opposing eyelets, including a topmost set of opposing eyelets, the system comprising:
   (a) an elastic shoelace that is stretchable between a non-stretched configuration and a stretched configuration, the elastic shoelace comprising (i) an elongate body having a first end and a second end, and (ii) first and second toggles disposed on the respective first and second ends of the elongate body, each of the first and second toggles comprising a first end portion secured to a respective one of the first and second ends of the elongate body and a second end portion movable from a first position that is aligned with the elongate body to a second position that is spaced from the elongate body; and
   (b) a unitary body comprising means for engaging the first and second toggles with the first and second toggles in the second position to secure the first and second ends of the shoelace in the unitary body in a fixed position between the topmost set of opposing toggles without any portion of the shoelace hanging out of the unitary body.

2. The system of claim 1, wherein the unitary body comprises first and second sides, and first and second channels extending from the first side to the second side of the unitary body with each of the first and second channels comprising a lip along at least a portion thereof; wherein each of the first and second channels is sized and dimensioned to permit the first and second ends of the elongate body to pass through either of the respective channels from the first side to the second side of the unitary body with the first and second toggles in the first position, and wherein the respective lips of the first and second channels are configured and arranged to engage respective of the first and second toggles with the first and second toggles in the second position when the first and second ends of the elongate body have passed through the respective first and second channels and respective forces pull on the respective first and second ends of the elongate body toward removal of the respective first and second ends from the respective first and second channels, and wherein, with the shoelace threaded through the eyelets in the shoe, with the first and second ends of the elongate body passed through the respective first and second channels of the unitary body and with the respective lips of the first and second channels engaging the respective first and second ends of the elongate body with the first and second toggles in the second position, the respective lips secure the respective first and second ends of the elongate body in place and prevent them from being pulled out of the respective first and second channels of the unitary body when the respective forces pull on the respective first and second ends toward their removal.

3. The system according to claim 2, wherein the elastic shoelace is sized and dimensioned such that, with the elastic shoelace threaded through the plurality of sets of opposing eyelets of the shoe, with the respective first and second ends of the elongate body passing through the respective first and second channels of the unitary body and with the respective second portions of the first and second ends in the second position, the elastic shoelace is in the stretched configuration and exerts a force on each of the respective first and second ends that causes the first and second ends to engage with the respective lips of the first and second channels to secure the respective first and second ends in place in the unitary body.

4. The system according to claim 3, wherein the unitary body comprises opposing top and bottom sides that are disposed substantially transverse to the first and second sides, wherein each of the top and bottom sides comprises respective first and second grooves along at least a portion of a length thereof, and wherein the respective lips of the first and second channels are disposed in respective bottoms of the first and second grooves in the top and bottom sides of the unitary body.

5. The system according to claim 4, wherein the first groove in the top side of the unitary body extends along an entirety of the top side of the unitary body and forms an opening at a top portion of each of the first and second sides, wherein the second groove in the bottom side of the unitary body extends along an entirety of the bottom side of the unitary body and forms an opening at a bottom portion of each of the respective first and second sides, wherein the first channel extends diagonally from a middle portion of the first side to the opening formed by the first groove at the top portion of the second side and the second channel extends diagonally from a middle portion of the second side to the opening formed by the second groove at the bottom portion of the first side, and wherein the lip of the first channel extends from the first side of the unitary body along a portion of the bottom of the first groove in the top side of the unitary body and the lip of the second channel extends from the second side of the unitary body along a portion of the bottom of the second groove in the bottom side of the unitary body.

6. The system according to claim 2, wherein a length and elasticity of the shoelace is such that, when threaded through the sets of opposing eyelets of the shoe with the shoelace first passing through a bottom pair of opposing eyelets and then passing in crisscross fashion consecutively through each of the other sets of opposing eyelets, including a top set of opposing eyelets, the respective first and second ends of the elongate body are in the stretched configuration with a wearer's foot in the shoe and with the respective first and second end secured in the first and second channels in the unitary body.

7. The system according to claim 6, wherein the length of the elongate body satisfies the following equation:

$$\text{Length} = (e \times 2 \times 0.125) + bes + 2 * \left(\sqrt{bes^2 + edist^2}\right) +$$
$$2 * \sqrt{(bes + \text{Span}\Delta)^2 + edist^2} + 2 * \sqrt{(bes + 2 * \text{Span}\Delta)^2 + edist^2} +$$
$$2 * \sqrt{(bes + 3 * \text{Span}\Delta)^2 + edist^2} + 2 * \sqrt{(bes + 4 * \text{Span}\Delta)^2 + edist^2},$$

wherein
e=a number of sets of eyelets of the shoe,
tes=a top eyelet span of the shoe,
bes=a bottom eyelet span of the shoe,
edist=an eyelet spacing distance of the shoe,
Span $\Delta$=tes−bes, and
pe $\Delta$=per eyelet span $\Delta$=Span $\Delta \div (e-1)$.

8. The system according to claim 7, further comprising packaging comprising the elastic shoelace, and the unitary body.

9. A lace lock for an elastic lace comprising an elongate body, wherein the elongate body is stretchable between a non-stretched configuration and a stretched configuration, wherein the elastic lace comprises (i) an elongate body having a first end and a second end, and (ii) first and second toggles disposed on the respective first and second ends of the elongate body, each of the first and second toggles comprising a first end portion secured to a respective one of the first and second ends of the elongate body and a second end portion movable from a first position that is aligned with the elongate body to a second position that is spaced from the elongate body, the lace lock comprising a unitary body having first and second sides, the unitary body comprising first and second channels extending from the first side to the second side of the unitary body with each of the first and second channels comprising a lip along at least a portion thereof; wherein each of the first and second channels is sized and dimensioned to permit the first and second ends of the elongate body to pass through either of the respective channels from the first side to the second side of the unitary body with the first and second toggles in the first position, and wherein the respective lips of the first and second channels are configured and arranged to engage respective of the first and second toggles with the first and second toggles in the second position when the first and second ends of the elongate body have passed through the respective first and second channels and respective forces pull on the respective first and second ends of the elongate body toward removal of the respective first and second ends from the respective first and second channels, and wherein, with the shoelace threaded through the eyelets in a shoe, with the first and second ends of the elongate body passed through the respective first and second channels of the unitary body and with the respective lips of the first and second channels engaging the respective first and second ends of the elongate body with the respective first and second toggles in the second position, the respective lips secure the respective first and second ends of the elongate body in place and prevent them from being pulled out of the respective first and second channels of the unitary body when the respective forces pull on the respective first and second ends toward their removal, wherein the unitary body comprises opposing top and bottom sides that are disposed substantially transverse to the first and second sides, wherein each of the top and bottom sides comprises respective first and second grooves along at least a portion of a length thereof, and wherein the respective lips of the first and second channels are disposed in respective bottoms of the first and second grooves in the top and bottom sides of the unitary body.

10. The lace lock according to claim 9, wherein the first groove in the top side of the unitary body extends along an entirety of the top side of the unitary body and forms an opening at a top portion of each of the first and second sides, wherein the second groove in the bottom side of the unitary body extends along an entirety of the bottom side of the unitary body and forms an opening at a bottom portion of each of the respective first and second sides, wherein the first channel extends diagonally from a middle portion of the first side to the opening formed by the first groove at the top portion of the second side and the second channel extends diagonally from a middle portion of the second side to the opening formed by the second groove at the bottom portion of the first side, and wherein the lip of the first channel extends from the first side of the unitary body along a portion of the bottom of the first groove in the top side of the unitary body and the lip of the second channel extends from the second side of the unitary body along a portion of the bottom of the second groove in the bottom side of the unitary body.

11. A method for making a shoelace of a predetermined size for matching to a shoe comprising a plurality of sets of opposing eyelets, the method comprising the steps of:

(a) providing a spool of lace to be cut into shoelaces of the predetermined size, wherein the lace has an elasticity that allows it to stretch from an unstretched configuration to a stretched configuration;

(b) determining a length of each of the shoelaces according to the following equation:

$$\text{Length} = (e \times 2 \times 0.125) + bes + 2 * \left(\sqrt{bes^2 + edist^2}\right) +$$
$$2 * \sqrt{(bes + \text{Span}\Delta)^2 + edist^2} + 2 * \sqrt{(bes + 2 * \text{Span}\Delta)^2 + edist^2} +$$
$$2 * \sqrt{(bes + 3 * \text{Span}\Delta)^2 + edist^2} + 2 * \sqrt{(bes + 4 * \text{Span}\Delta)^2 + edist^2},$$

wherein
e=a number of sets of eyelets of the shoe,
tes=a top eyelet span of the shoe,
bes=a bottom eyelet span of the shoe,
edist=an eyelet spacing distance of the shoe,
Span $\Delta$=tes−bes, and
pe $\Delta$=per eyelet span $\Delta$=Span $\Delta \div (e-1)$;

(c) cutting the lace from the spool of lace into a plurality of the shoelaces of the desired length, with each of the plurality of shoelaces comprising a first end and a second end;

(d) attaching a first toggle to the first end of each of the plurality of shoelaces with a first portion of the first toggle attached to the first end of each of the plurality of shoelaces and a second portion of the first toggle free to move between a first position aligned with the shoelace and a second position spaced from the shoelace; and (e) attaching a second toggle to the second end of each of the plurality of shoelaces with a first portion of the second toggle attached to second end of each of the plurality of shoelaces and a second portion of the second toggle free to move between a first position aligned with the shoelace and a second position spaced from the shoelace.

12. The method according to claim 11, further comprising the step of packaging the lace into a package that also comprises a label, instruction sheet or diagram that indicates the shoe with which the shoelace of the predetermined size is matched.

\* \* \* \* \*